United States Patent [19]
Shinagawa et al.

[11] Patent Number: 6,143,256
[45] Date of Patent: Nov. 7, 2000

[54] APPARATUS FOR CONTROLLING AN OZONE GENERATOR

[75] Inventors: Misato Shinagawa; Takashi Tanioka; Mitsuo Terada; Yoshiyuki Nishimura, all of Takasago, Japan

[73] Assignee: Kabushiki Kaisha Kobe Seiko Sho, Kobe, Japan

[21] Appl. No.: 09/095,609

[22] Filed: Jun. 11, 1998

[30] Foreign Application Priority Data

Jun. 11, 1997 [JP] Japan .................................... 9-153390

[51] Int. Cl.[7] .............................. B01J 19/08; B01J 19/12
[52] U.S. Cl. ................................ 422/186.15; 422/186.28
[58] Field of Search ........................ 422/186.15, 186.16, 422/186.28

[56] References Cited

FOREIGN PATENT DOCUMENTS

| 4-164804 | 6/1992 | Japan . |
| 9-175803 | 7/1997 | Japan . |
| 08091808A | 4/1998 | Japan . |

OTHER PUBLICATIONS

Abstract for JP 08091808 A, Apr. 9, 1996.

*Primary Examiner*—Kathryn Gorgos
*Assistant Examiner*—Wesley A. Nicolas
*Attorney, Agent, or Firm*—Reed Smith Hazel & Thomas LLP

[57] ABSTRACT

The invention provides an ozone generator controlling apparatus capable of controlling an ozone generator so that when a discharge breakdown occurs in some discharge element, the operation of generating ozone can be continued without imposing a bad influence on the remaining normal discharge elements. When an anomaly occurs in one of or a plurality of discharge elements during the operation of generating ozone, the anomaly is detected by an anomaly detection means. In response to the detection of the anomaly, first output control means reduces the output of an AC power supply circuit to a sufficiently low level so that after the discharge element having the anomaly is isolated from the circuit the operation of generating ozone can be continued with the remaining normal discharge elements without interruption and without causing the normal discharge elements to encounter an overload current thus preventing them from being broken one after another. The discharge element having the anomaly may be isolated using nondestructive current cut-off means such as a high-voltage relay. In this case, the current cut-off means can be used for a very long time without having to replace when a breakdown occurs in some discharge element, unlike the case where a fuse is used as the current cut-off means. When an anomaly occurs in some discharge element, instead of immediately isolating it from the circuit, the output of the AC power supply circuit may be reduced using second output control means until the current detected by the current detection means becomes lower than the predetermined upper allowable limit. This makes it possible to continue the operation of generating ozone without isolating the discharge element having the anomaly.

8 Claims, 4 Drawing Sheets

APPARATUS FOR CONTROLLING AN OZONE GENERATOR

BACKGROUND OF THE INVENTION

1. Field of the Invention

The present invention relates to an ozone generator controlling apparatus for controlling an ozone generator adapted to generate ozone by applying the output of an AC power supply circuit to a single or a plurality of discharge elements connected in parallel.

2. Description of the Related Art

Ozone generators generally generate ozone by applying a high voltage with a high frequency to a plurality of discharge elements from an AC power supply circuit. In conventional ozone generators, a fuse is connected in series to each discharge element so that when an anomaly such as a discharge breakdown (local dielectric breakdown (short circuit) which occurs in a ceramic discharge surface when excess electric power greater than maximum allowable power is applied to a particular part of the effective discharge surface of some discharge element) occurs in some discharge element, the failed discharge element is separated from the circuit by melting the fuse. An example of such an ozone generator is disclosed for example in Japanese Patent Publication No. 57-45685 (hereinafter the technique disclosed in this patent will be described simply as the conventional technique).

FIG. 4 illustrates the ozone generator AO according to the conventional technique. As shown in FIG. 4, the ozone generator AO comprises an automatic voltage regulator 51, an inverter circuit 50 including thermistors 52 to 55, a transformer 56, discharge elements connected in parallel to the output of the transformer 56, fuses 58 connected in series to the respective discharge elements 57, a power supply 59 connected to the input of the transformer 56 and also to the inverter 50 in a parallel fashion, and normally-open switches 60 disposed between the power supply 59 and the transformer 56.

The automatic voltage regulator 51 converts commercial electric power to a regulated DC voltage. The inverter 50 converts the DC output voltage of the automatic voltage regulator 51 to a high-frequency voltage (1 to 10 kHz). The transformer 56 increases the output voltage of the inverter 50 to a voltage sufficiently high to generate ozone, for example, in the range of 10 to 20 kV. The high voltage output from the transformer 56 is applied to the respective discharge elements 57. If the high voltage with the high frequency is applied to the discharge elements, uniform discharge occurs between two plates of ceramic in the discharge region of the discharge elements 57. Ozone gas is generated during the process in which oxygen gas passes through the discharge space.

In the ozone generator AO, if a discharge breakdown occurs in some discharge element 57 and an excess current flows in it, the automatic voltage regulator 51 is immediately turned off to protect the semiconductor devices such as thermistors 52–55. However this causes a possibility that the automatic voltage regulator 51 is turned off before the fuse 58 connected to the discharge element 57, in which the discharge breakdown occurred, melts. In the ozone generator AO, to avoid the above problem, the normally-open switch 60 is closed immediately after the start of the operation of turning off the automatic voltage regulator 51 thereby connecting the transformer 56 to the power supply 59 having the capability of outputting a voltage equal to the output voltage of the inverter 50 so that a high voltage is still applied to the respective discharge elements 57 thus causing the fuse connected to the discharge element 57 which encountered the discharge breakdown to melt thereby ensuring that a short circuit is prevented from occurring.

In the ozone generator AO according to the conventional technique, as described above, when the output of the automatic voltage regulator 51 is cut off, electric power equal to that supplied in the normal state is supplied from the power supply 59 without interruption thereby ensuring that the fuse 58, connected to the discharge element 58 which encountered the discharge breakdown, melts. However, even after the fuse 58 melts and the discharge element 57 which encountered the discharge breakdown is isolated from the circuit, the electric power equal to that supplied in the normal state is still supplied, and thus an overload current flows through the remaining normal discharge elements 57. In the ozone generator AO according to the conventional technique, the above-described overload current can cause the remaining normal discharge elements 57 to encounter a discharge breakdown one after another.

Furthermore, in the ozone generator AO according to the conventional technique, when a discharge breakdown occurs, the only action taken is that the fuse 58 connected to the failed discharge element 57 is cut off, and it is impossible to determine which discharge element is failed and how many discharge elements are failed. This makes it difficult to quickly take a corrective action after the failure.

Furthermore, the result of the employment of fuses 58 is that a fuse 59 is needed to be replaced whenever a discharge breakdown occurs in some discharge element 57. This brings about the disadvantage that expensive and troublesome tasks are required.

In view of the above, it is an object of the present invention to provide an apparatus for controlling an ozone generator in such a manner that when a discharge breakdown occurs in some discharge element, ozone is still generated without imposing bad influence on the remaining normal discharge elements. It is another object of the present invention to provide an apparatus for controlling an ozone generator, which does not require current cut-off means such as a fuse to be replaced whenever a discharge breakdown occurs in some discharge element.

SUMMARY OF THE INVENTION

According to a first aspect of the present invention, there is provided an ozone generator controlling apparatus for controlling an ozone generator adapted to generate ozone by applying the output of an AC power supply circuit to a single discharge element or a plurality of discharge elements connected in parallel, the ozone generator controlling apparatus comprising: anomaly detection means for detecting an anomaly in the single or plurality of discharge elements; and first output control means for reducing the output of the AC power supply circuit to a predetermined value in response to detection of an anomaly by the anomaly detection means.

Preferably, the anomaly detection means determines that there is an anomaly when the current detected by the current detection means for detecting the current flowing through the single or plurality of discharge elements becomes zero as a result of, for example, burning out of some of fuses connected in series to the respective discharging elements.

Alternatively, there may be provided current detection means for detecting the current flowing through said discharge element, and said anomaly detection means determines that an anomaly occurs when the current detected by said current detection means exceeds a predetermined allowable upper limit.

The predetermined upper allowable limit may be set for each discharge element. This makes it possible for the ozone generator controlling apparatus to adapt to variations in the normal rated power of the discharge elements.

The ozone generator controlling apparatus may further include a current cut-off means for cutting off the current flowing through a discharge element in such a manner that the current may be turned on again, and current cut-off control means for controlling the current cut-off means to cut off the current flowing through the discharge element which is detected by the anomaly detection means to have an anomaly. In this case, the current cut-off means can be used for a very long time without having to be replaced, unlike the apparatus using the fuse which has to be replaced whenever a breakdown occurs in a discharge element.

The ozone generator controlling apparatus may further include a second control means for controlling the AC power supply circuit in such manner that when the value detected by said current detection means reaches the predetermined upper allowable limit, the second control means reduces the output of the AC power supply circuit until the value detected by the current detection means becomes lower than the predetermined upper allowable limit. This arrangement makes it possible that when a discharge breakdown occurs, if it is limited to a particular local area of a discharge element, then the operation of generating ozone can be continued without isolating the discharge element from the circuit, by reducing the electric power supplied to the discharge elements down to a proper level. This arrangement also makes it possible to protect the discharge elements from a discharge breakdown when the value detected by the current detection means increases due to a variation of load caused for example by a variation in the external pressure.

In the ozone generator controlling apparatus, the predetermined output value R1 is given for example by $R1 \leq (Na-Ne) \times Ps$ where Na is the total number of discharge elements, Ps is the normal rated power per each discharge element, and Ne is the number of discharge elements to which the current supply was stopped after detection of an overload current.

According to another aspect of the present invention, there is provided an ozone generator controlling apparatus for controlling an ozone generator adapted to generate ozone by applying the output of an AC power supply circuit to a single discharge element or a plurality of discharge elements connected in parallel, the ozone generator controlling apparatus comprising: current detection means for detecting the current flowing through the single or plurality of discharge elements; and current cut-off means for cutting off the current flowing through a discharge element in such a manner that when the current detected by said current detection means reaches a predetermined upper allowable limit and thus a discharge element is detected to have an overload current, the current cut-off means cuts off the current flowing through said discharge element in such a manner that the cut-off current may be recovered.

In the above-described first aspect of the invention, if an anomaly occurs in one or plurality of discharge elements during the operation of generating ozone, the anomaly is detected by the anomaly detection means, and which and how many discharge elements have the anomaly are determined. In response, the first output control means reduces the output of the AC power supply circuit until the output R1 comes to satisfy the following condition:

$$R1 \leq (Na-Ne) \times Ps$$

where Na is the total number of discharge elements, Ps is the normal rated power per each discharge element, and Ne is the number of discharge elements to which the current supply was stopped after detection of the overload current. In this control technique, when a discharge element having an anomaly is electrically isolated from the circuit, the remaining normal discharge elements do not encounter an overload current thereby ensuring that the operation is continued with the remaining discharge elements without interruption and without causing the remaining normal discharge elements to encounter a discharge breakdown one after another.

In the case where a fuse serving as the current cut-off means is connected in series to each discharge element, the anomaly detection means determines that an anomaly occurs when the value detected by the current detection means becomes zero, and determines which and how many discharge elements have the anomaly. In the case where the current cut-off means is realized by a device such as a high-voltage relay which can cut off the current flowing through each discharge element in such a manner that the cut-off state can be recovered to the original state, the anomaly detection means determines that an anomaly occurs when the value detected by the current detection means reaches the predetermined upper allowable limit, and determines which and how many discharge elements have the anomaly. In this case, when an anomaly is detected by the anomaly detection means, the current cut-off control means controls the current cut-off means to cut-off the current flowing through the discharge element which was detected, by the anomaly detection means, to have the anomaly. When the current cut-off means is realized by a device such as high-voltage relay which can be recovered to the normal state from the cut-off state, the current cut-off means can be used for a very long time without having to be replaced, unlike the apparatus using the fuse which has to be replaced whenever a breakdown occurs in a discharge element.

When a discharge breakdown occurs, if it is limited to a particular local area, then the operation can be continued in many cases without encountering a serious problem, by immediately reducing the electric power supplied to the discharge elements by a certain amount (for example down to 30 to 50% of the normal rated power) thereby reducing the load due to the local area where the discharge breakdown occurs. This means that when an anomaly occurs in some discharge element, instead of immediately isolating the discharge element, the second control means may reduce the output of the AC power supply circuit until the value detected by the current detection means becomes lower than the predetermined upper allowable limit. This makes it possible to continue the operation of generating ozone without isolating the discharge element from the circuit. This technique also makes it possible to protect the discharge elements from a discharge breakdown when the value detected by the current detection means increases due to a variation of load caused, for example, by a variation in the external pressure.

In the above-described second aspect of the invention, when the current detected by the current detection means reaches the predetermined upper allowable limit and thus a discharge element is detected to have an overload current, the current cut-off means such as a high-voltage relay is turned off in a nondestructive fashion to cut off the current flowing through the discharge element. The current cut-off means can be used for a very long time without having to be replaced, unlike the fuse which has to be replaced whenever a breakdown occurs in a discharge element.

DESCRIPTION OF THE PREFERRED EMBODIMENTS

The present invention is described in further detail below with reference to preferred embodiments in conjunction with the accompanying drawing. It should be understood that the preferred embodiments described below are provided only for illustrative purposes and the present invention is not limited to the details of these specific embodiments.

Figure 1:
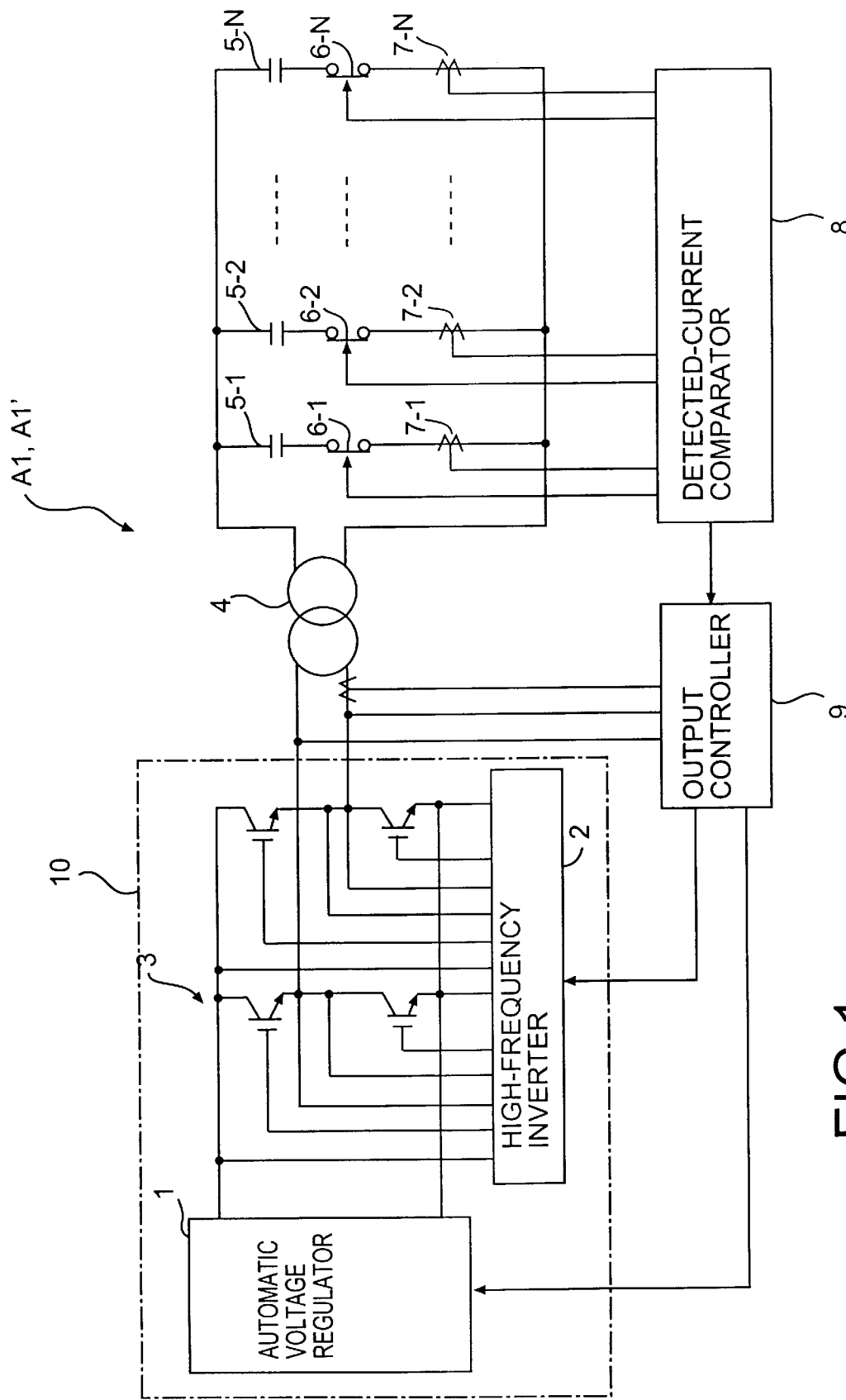
FIG. 1 is a schematic diagram illustrating an embodiment of an ozone generator A1 according to the present invention (an ozone generator A1' also has a similar structure)
Figure 2:
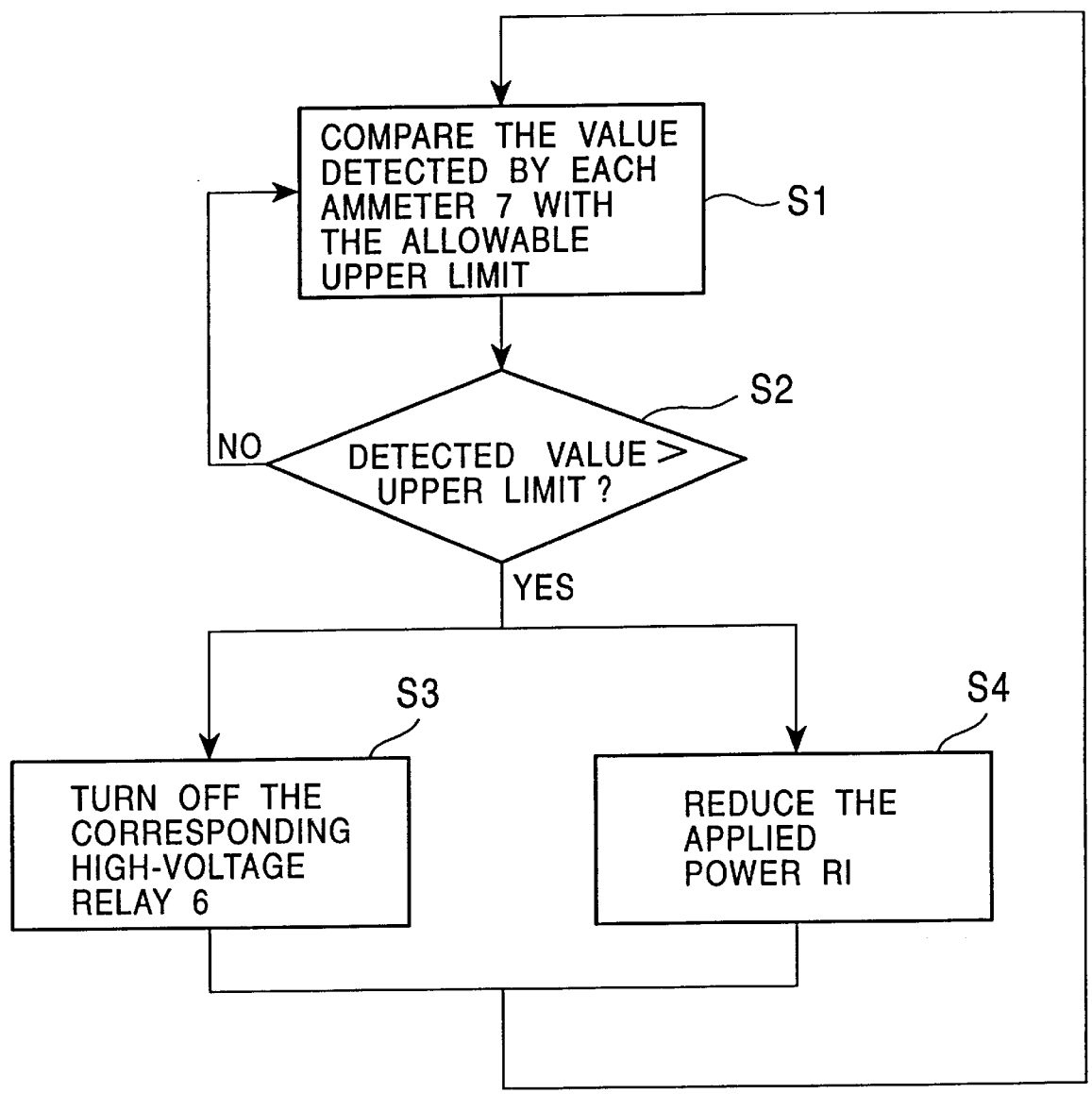
FIG. 2 is a flow chart illustrating a control process performed when an anomaly occurs in the ozone generator A1.
Figure 3:
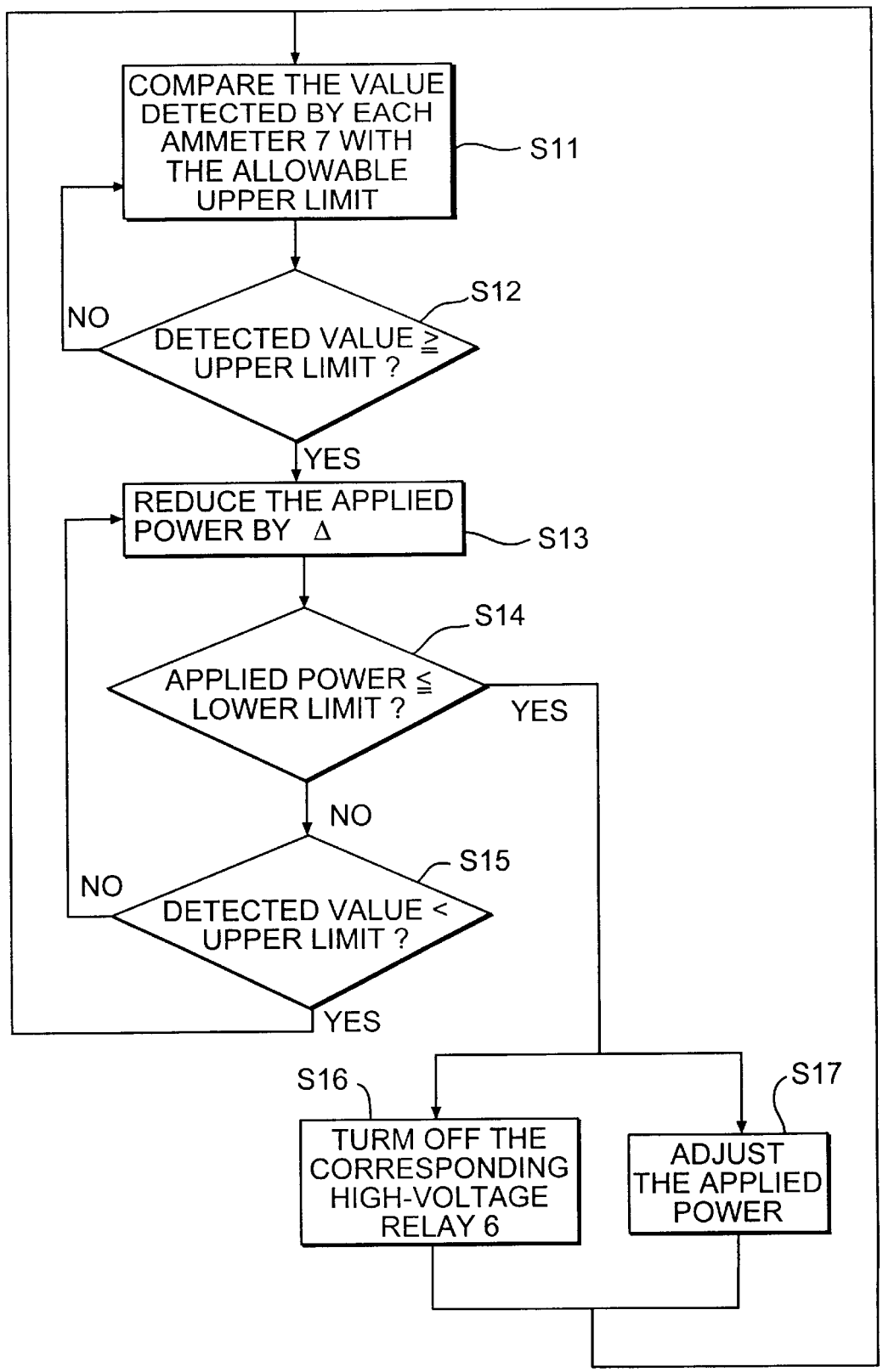
FIG. 3 is a flow chart illustrating a control process performed when an anomaly occurs in the ozone generator A1'.
Figure 4:
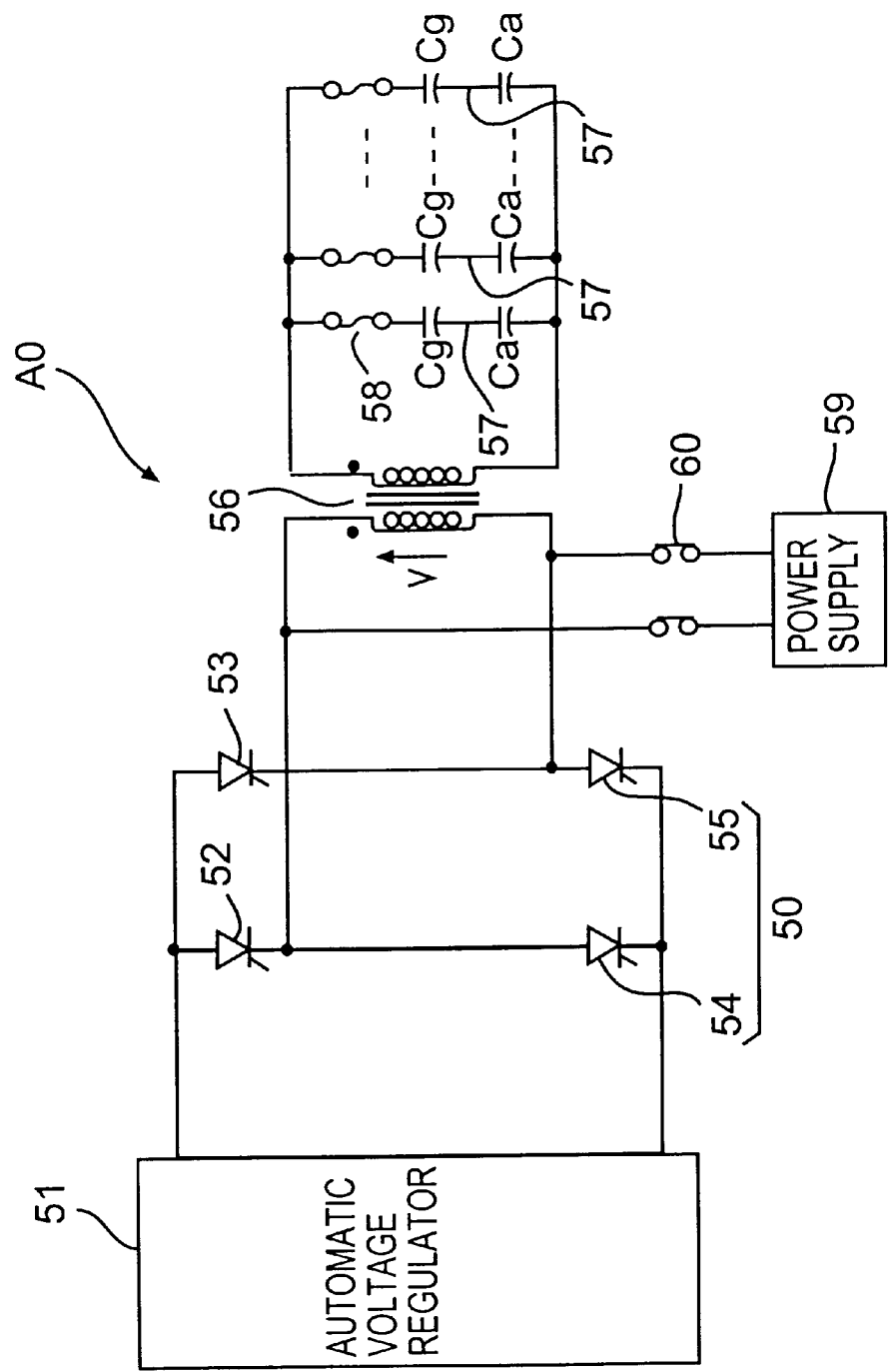
FIG. 4 is a schematic diagram illustrating an ozone generator AO according to a conventional technique.

FIG. 1 is a schematic diagram illustrating an embodiment of an ozone generator A1 according to the present invention (an ozone generator A1' which will be described later also has a similar structure). FIG. 2 is a flow chart illustrating a control process performed when a failure occurs in the ozone generator A1. FIG. 3 is a flow chart illustrating a control process performed when a failure occurs in the ozone generator A1'.

As shown in FIG. 1, the ozone generator A1 according to the present embodiment comprises an AC high-voltage power supply circuit 10 (corresponding to the AC Power supply circuit), a transformer 4 connected to the AC high-voltage power supply circuit 10, n discharge elements 5-1 to 5-n (collectively referred to as discharge elements 5) connected in parallel to the transformer 4, high-voltage relays 6-1 to 6-n (serving as current cutoff means and collectively referred to as high-voltage relays 6) connected in series to the respective discharge elements 5 so as to serve to cut off the current in response to a cutoff signal supplied from a detected-current comparator 8 which will be described later, ammeters 7-1 to 7-n (serving as current detection means and collectively referred to as ammeters 7) connected in series to the respective discharge elements 5, the detected-current comparator 8 (corresponding to anomaly detection means and current cut-off control means), and an output controller 9 (corresponding to first and second control means).

The AC high-voltage power supply circuit 10 includes an automatic voltage regulator 1, a high-frequency inverter 2, and an insulated gate bipolar transistor (hereinafter referred to as "IGBT") circuit 3.

The detected-current comparator 8 is connected to the ammeters 7, the high-voltage relays 7, and the output controller 9. The detected-current comparator 8 is set so as to respond to a predetermined upper allowable limit of a current flowing through the discharge elements 5. The detected-current comparator 8 compares the currents detected by the ammeters 7 with the upper allowable limit. If the current detected by some ammeter 7 is greater than the upper allowable limit, the detected-current comparator 8 outputs a cutoff signal to the high-voltage relay 6 connected in series to that ammeter 7, and also outputs a control signal to the output controller 9 to indicate the number of discharge elements 5 which are cut off. The output controller 9 is connected to the detected-current comparator 8, the output of the AC high-voltage power supply circuit 10, the automatic voltage regulator 1, and the high-frequency inverter 2. If the output controller 9 receives from the detected-current comparator 8 the control signal representing the number of discharge elements 5 which are cut off, the output controller 9 controls the automatic voltage regulator 1 and the high-frequency inverter 2 while monitoring the electric power R1 supplied from the AC high-voltage power supply circuit 10 to the transformer 4, so as to reduce the electric power R1 supplied to the transformer 4 to a level low enough not to impose an overload current on the remaining discharge elements other than those which have been cut off.

Of the above-described constituent elements, the AC high-voltage power supply circuit 10 (including the automatic voltage regulator 1, the high-frequency inverter 2, and the IGBT circuit 3), the transformer 4, and the discharge elements 5 form an ozone generator, whereas the high-voltage relays 6, the ammeters 7, the detected-current comparator 8, and the output controller 9 form an apparatus for controlling the ozone generator.

The process in which ozone is generated by the ozone generator is briefly described below.

The automatic voltage regulator 1 converts commercial electric power to a DC voltage regulated at a desired value. The high-frequency inverter 2 and the IGBT circuit 3 convert the DC output voltage of the automatic voltage regulator 1 to an AC voltage with a desired frequency (1 to 10 kHz). The transformer 4 increases the output voltage of the AC high-voltage power supply circuit 10 to a voltage with a sufficiently high value (1 to 15 kV in peak to peak value). The resultant high voltage is applied to the respective discharge elements 5 (because the high-voltage relays 6 are normally closed). As a result of the application of the high voltage with the high frequency to the discharge elements 5, an uniform discharge occurs between two ceramic plates in the discharge part of each discharge element 5. During the process in which oxygen gas is passed through the discharge space, ozone gas is generated.

Referring now to FIGS. 1 and 2, the process of controlling the ozone generator A1 is described below, which is performed when a failure such as a discharge breakdown occurs in some discharge element 5 during the operation of generating ozone.

During the ozone generating operation by the ozone generator, the detected-current comparator 8 always compares the values of currents detected by the ammeters 7 with the predetermined upper allowable limit of the current (in step S1). If a discharge breakdown occurs for example in the discharge element 5-1 during the ozone generating operation, the current detected by the ammeter 7-1 increases. If the detected-current comparator 8 detects that the current detected by the ammeter 7-1 has become greater than the upper allowable limit, then the detected-current comparator 8 determines that a failure occurs in the discharge element 5-1 (in step S2), and outputs a cut-off signal to the high-voltage relay 6-1. In response, the high-voltage relay 6-1 is turned off and thus the discharge element 5-1 is electrically isolated from the circuit (in step S3). The detected-current comparator 8 also outputs a control signal to the output controller 9 to indicate the number Ne of the discharge elements 5 to which the current supply was stopped (Ne=1 in this specific example). In response to the control signal, the output controller 9 immediately reduces the electric power supplied from the AC high-voltage power supply circuit 10 to the transformer 4 down to a proper value so as to prevent an overload current from flowing through the remaining normal discharge elements 5 other than the discharge element 5-1 which has been isolated (step S4). More specifically, the output controller 9 has data representing the total number Na (=n) of discharge elements 5 and the normal rated power Ps per each discharge element. While monitoring the electric power R1 supplied from the AC high-voltage power supply circuit 10 to the transformer 4, the output controller 9 controls the output voltage of the automatic voltage regulator 1 and also performs fine adjustment of the oscillating frequency of the high-frequency inverter 2 and the switching time (duty cycle) of the IGBT circuit 3 so that the supplied electric power RI satisfies the following condition:

$$R1 \leq (Na-Ne) \times Ps \qquad (1)$$

where Na is the total number of discharge elements (Na=n), Ps is the normal rated power per each discharge element, and Ne is the number of discharge elements which are isolated from the circuit after detection of an overload current.

The above-described steps S1 to S3 are performed repeatedly.

In the ozone generator A1 according to the present embodiment, as described above, the current to one or more discharge elements 5, which have encountered an overload current due to a discharge dielectric breakdown, is cut off by turning off the corresponding high-voltage relays 6, and the supplied electric power is quickly reduced to a level so that the remaining normal discharge elements do not encounter an overload current thereby ensuring that the operation is continued with the remaining discharge elements without interruption and without causing the remaining normal discharge elements to encounter a discharge breakdown one after another which would occur in the conventional technique. Another advantage is that a proper and quick action can be taken when a failure occurs on the basis of knowledge about which and how many discharge elements are failed. Still another advantage is that since the high-voltage relays 6 are employed as the current cutoff means, it is not required to replace the current cutoff means unlike the case where fuses are employed, and thus it is possible to use the same current cutoff means for a very long time.

In general, when a discharge breakdown occurs, if it is limited to a particular local area, then the operation can be continued without encountering a serious problem, by immediately reducing the electric power supplied to the discharge elements by a certain amount (for example down to 30 to 50% of the normal rated power) thereby reducing the load due to the local area where the discharge breakdown occurs. In view of the above, when an overload current occurs in some discharge element, the operation may be continued after reducing the electric power to a level low enough to prevent a problem due to the overload current, without isolating the discharge element which has encountered an overload current. The control operation in this case is described in further detail below with reference to FIGS. 1 and 3.

An ozone generator A1' used in this case is substantially the same as the ozone generator A1 shown in FIG. 1 except that it is controlled in a different manner by the detected-current comparator 8 and the output controller 9. The process of controlling the ozone generator A1' is described below with reference to FIG. 3.

During the ozone generating operation, the detected-current comparator 8 always compares the values of currents detected by the ammeters 7 with the predetermined upper allowable limit of the current (in step S11). If a discharge breakdown occurs for example in the discharge element 5-1 during the ozone generating operation, the current detected by the ammeter 7-1 increases. When the current detected by the ammeter 7-1 has become equal to the upper allowable limit, the detected-current comparator 8 determines that a dielectric breakdown occurs partially in the discharge element 5-1 (in step S12), and outputs a command to the output controller 9 to reduce the electric power supplied from the AC high-voltage power supply circuit 10 to the transformer 4 by a predetermined amount A (step S13). After the reduction in the supplied electric power by Δ, the detected-current comparator 8 compares the currents detected by the respective ammeters 7 with the upper allowable limit (step S15). If it is determined in step S15 that the currents detected by the respective ammeters 7 are lower than the upper allowable limit, that is, if an overload current is avoided, the process returns to step S11 and the operation is further continued. On the other hand, if it is determined in step S15 that all the currents detected by the respective ammeters 7 are not lower than the upper allowable limit, then the process returns to step S13 and the supplied electric power is further reduced by Δ. The steps S13 and 15 are performed repeatedly until the supplied electric power reaches a predetermined lower allowable limit (step S14). When the supplied electric power reaches the lower allowable limit, if the currents detected by the respective ammeters 7 are still higher than the upper allowable limit, then the detected-current comparator 8 outputs a cutoff signal to the high-voltage relay 6-1. In response, the high-voltage relay 6-1 is turned off, and thus the discharge element 5-1 is electrically isolated from the circuit (step S16). The detected-current comparator 8 also outputs a control signal to the output controller 9 to indicate the number Ne of the discharge elements 5 to which the current supply was stopped (Ne =1 in this specific example). The output controller 9 controls the output voltage of the automatic voltage regulator 1 and also performs fine adjustment of the oscillating frequency of the high-frequency inverter 2 and the switching time (duty cycle) of the IGBT circuit 3 so that the supplied electric power R1 satisfies the condition (1) described above (step S17).

Steps S11 to S17 are performed repeatedly.

In parallel to steps S11 to S15, a supplied power optimization process is also performed so that the supplied electric power is controlled to be optimum within the range lower than the upper allowable limit.

Although a plurality of discharge elements 5 are connected in parallel in the present embodiment, the technique described above may also be applied to the case where there is only a single discharge element.

In the ozone generator A1' according to the present embodiment, as described above, when a discharge breakdown occurs partially in some discharge element, the supplied electric power is reduced to a level which allows the ozone generator A1' to continue the operation of generating ozone without isolating the discharge element from the circuit.

In the above embodiment, it is assumed that a partial discharge breakdown in a discharge element results in an increase in the current detected by the ammeter 7. However, an increase in the current detected by the ammeters 7 can also occur due to other factors such as a change in the load caused by a change in the external pressure. In such a case, although a discharge breakdown does not occur in discharge elements, a continuation of the overload current can eventually result in a discharge breakdown. In the above-described control process associated with the ozone generator A1', the overload current due to such a cause is also adjusted to the normal value. This ensures that the discharge elements are protected from a discharge breakdown. If the load such as the external pressure returns to the normal value, the supplied electric power which was reduced by the electric power optimization process is returned to the original value.

The above-described control process is possible because the status of each discharge element is always correctly monitored by the detected-current comparator 8.

In the embodiments described above, if the predetermined upper allowable limit is set individually for each discharge element, it becomes possible that the ozone generator controlling apparatus is adapted to variations in the normal rated power of the discharge elements.

As can be understood from the above description, the present invention has various advantages as summarized below. In the first aspect of the invention, the ozone generator controlling apparatus for controlling an ozone generator, which is adapted to generate ozone by applying the output of an AC power supply circuit to a single or a plurality of discharge elements connected in parallel, comprises anomaly detection means for detecting an anomaly in the single or plurality of discharge elements, and first output control means for reducing the output of the AC power supply circuit to a predetermined value in response to detection of an anomaly by the anomaly detection means. In this ozone generator controlling apparatus, when a discharge breakdown occurs in one of a plurality of discharge elements, the operation can be continued with the remaining discharge elements without interruption and without causing the remaining normal discharge elements to encounter a discharge breakdown one after another which would occur in the conventional technique.

If the apparatus includes current detection means for detecting the current flowing through one or more discharge elements, then the anomaly detection means can determine that an anomaly occurs when the current detected by the current detection means exceeds a predetermined allowable upper limit. This makes it possible to detect the status of each discharge element and perform quick and correct control.

If the predetermined upper allowable limit is set individually for each discharge element, it becomes possible that the ozone generator controlling apparatus is adapted to variations in the normal rated power of the discharge elements.

In the case where the apparatus includes current cut-off means for cutting off the current flowing through the discharge element in such a manner that the current cut-off means is not broken, and current cut-off control means for controlling the current cut-off means to cut off the current flowing through the discharge element which is detected by the anomaly detection means to have an anomaly, the current cut-off means can be used for a very long time without having to be replaced, unlike the fuse which has to be replaced whenever a breakdown occurs in a discharge element.

Furthermore, in the case where the ozone generator controlling apparatus includes second control means for controlling the AC power supply circuit in such manner that when the value detected by the current detection means reaches the predetermined upper allowable limit, the second control means reduces the output of the AC power supply circuit until the value detected by the current detection means becomes lower than the predetermined upper allowable limit, when a discharge breakdown occurs, if it is limited to a particular local area of a discharge element, then the operation of generating ozone can be continued without isolating the discharge element from the circuit, by reducing the electric power supplied to the discharge elements down to a proper level. Furthermore, when the value detected by the current detection means increases due to a variation of load caused for example by a variation in the external pressure, the discharge elements can be protected from a discharge breakdown by immediately controlling the current to a correct value.

In the second aspect of the invention, the ozone generator controlling apparatus for controlling an ozone generator, which is adapted to generate ozone by applying the output of an AC power supply circuit to a single or a plurality of discharge elements connected in parallel, comprises current detection means for detecting the current flowing through the single or plurality of discharge elements, and current cut-off means for cutting off the current flowing through a discharge element in such a manner that when the current detected by the current detection means reaches a predetermined upper allowable limit and thus a discharge element is detected to have an overload current, said current cut-off means cuts off the current flowing through the discharge element in such a manner that the current cut-off means is not broken. In this ozone generator controlling apparatus, it is not required to replace the current cut-off means, unlike the apparatus using a fuse which has to be replaced whenever a breakdown occurs in a discharge element.

The entire disclosure of Japanese Patent Application No. 9-153390 filed on Jun. 11, 1997 including specification, claims, drawings and summary are incorporated herein by reference in its entirety.

What is claimed is:

1. A controller apparatus for controlling an ozone generator, said controller comprising:
   an ozone generating unit including a plurality of discharge elements to which a non-stop output voltage is applied from an AC power supply circuit;
   anomaly detection means for detecting an anomaly in said each discharge element; and
   output control means for reducing the non-stop output of the AC power supply circuit by a predetermined amount when an anomaly is detected by said anomaly detection means, wherein the non-stop output is reduced without being cut off.

2. An apparatus for controlling an ozone generator, according to claim 1, said controller further comprising current detection means for detecting the current flowing through said discharge elements, wherein said anomaly detection means determines that an anomaly occurs when the current detected by said current detection means exceeds a predetermined allowable upper limit.

3. An apparatus for controlling an ozone generator, according to claim 2, wherein said predetermined upper allowable limit is set for each discharge element.

4. An apparatus for controlling an ozone generator, according to claim 2, said controller further comprising:
   current cut-off means for cutting off the current flowing through the discharge element in such a manner that the current cut-off means is not broken;
   and current cut-off control means for controlling said current cut-off means to cut off the current flowing through the discharge element which is detected by said anomaly detection means to have an anomaly.

5. An apparatus for controlling an ozone generator, according to claim 4, said controller further comprising second control means for controlling said AC power supply circuit in such manner that when the value detected by said current detection means reaches the predetermined upper allowable limit, said second control means reduces the non-stop output of said AC power supply circuit until the value detected by said current detection means becomes lower than the predetermined upper allowable limit.

6. An apparatus for controlling an ozone generator, according to claim 1, said controller further comprising:

fuses connected in series to respective discharge elements, wherein said anomaly detection means determines that there is an anomaly when the current detected by the current detection means for detecting the current flowing through the discharge element becomes zero as a result of burning out of some of said fuses.

7. An apparatus for controlling an ozone generator, according to claim 4, wherein said anomaly detection means determine how many discharge elements have an anomaly.

8. An apparatus for controlling an ozone generator, according to claim 7, wherein said current cut-off means cut off the current flowing through the discharge element which is detected by said anomaly detection means to have an anomaly when the non-stop output of the AC power supply circuit is reduced to a lower limit calculated with the following equation:

$$R1=(Na-Ne){\times}Ps$$

where,

R1 is the lower limit of the non-stop output;

Na is the total number of discharge elements;

Ne is the number of discharge elements in which the anomaly is detected; and

Ps is the normal rated power per each discharge element.

* * * * *